United States Patent [19]

Iwashita

[11] Patent Number: 5,107,193

[45] Date of Patent: Apr. 21, 1992

[54] FEEDFORWARD CONTROL APPARATUS FOR A SERVOMOTOR

[75] Inventor: Yasusuke Iwashita, Yamanashi, Japan

[73] Assignee: Fanuc Ltd., Minamitsuru, Japan

[21] Appl. No.: 601,796

[22] PCT Filed: Mar. 20, 1990

[86] PCT No.: PCT/JP90/00380
§ 371 Date: Nov. 5, 1990
§ 102(e) Date: Nov. 5, 1990

[87] PCT Pub. No.: WO90/11562
PCT Pub. Date: Apr. 10, 1990

[30] Foreign Application Priority Data

Mar. 20, 1989 [JP] Japan .................................. 1-65921
Jun. 15, 1989 [JP] Japan .................................. 1-150481

[51] Int. Cl.$^5$ ........................ G05B 13/00; G05D 3/12
[52] U.S. Cl. .................................. 318/560; 318/610; 318/615; 318/616
[58] Field of Search .......................... 318/560-668; 364/513; 901/3, 6, 9, 12, 13, 15-23

[56] References Cited

U.S. PATENT DOCUMENTS 4,956,594 9/1990 Mizuno et al. .................. 318/632 X
4,992,715 2/1991 Nakamura et al. ................ 318/669

Primary Examiner—Paul Ip
Attorney, Agent, or Firm—Staas & Halsey

[57] ABSTRACT

A feedforward control apparatus capable of operating a servomotor smoothly and stably. A first feedforward controlled variable, obtained by differentiating a position command in a first feedforward term, is added to a control output of a position control loop, which varies depending on a positional deviation to obtain a speed command, whereby a response delay of the position control loop with respect to the position command is compensated to reduce control errors. Also, a second feedforward controlled variable, obtained by differentiating the first feedforward controlled variable in a second feedforward term, is added to a control output of a speed control loop, which varies depending on a speed deviation, whereby a response delay of the speed control loop with respect to the speed command is compensated to improve control stability, so that the servomotor and a mechanical system can be prevented from being shocked.

5 Claims, 7 Drawing Sheets

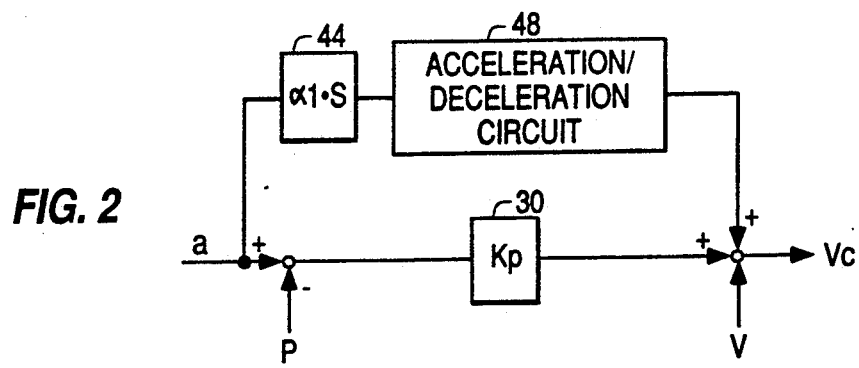
FIG. 2
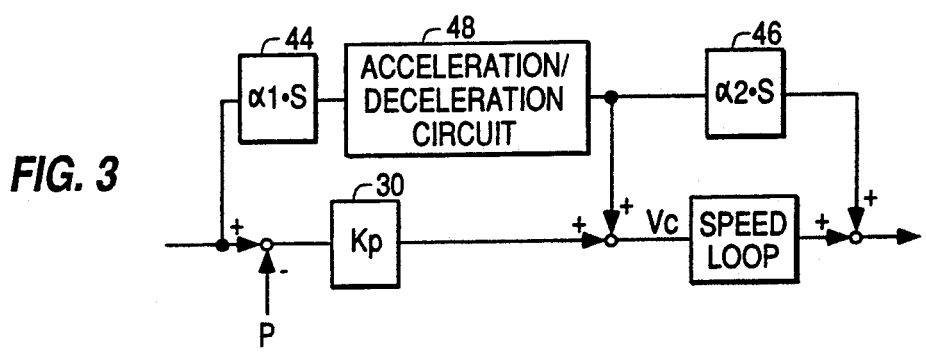
FIG. 3
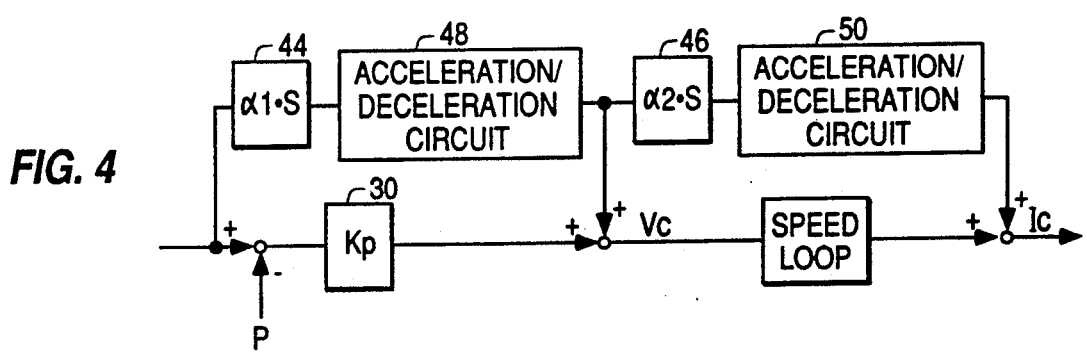
FIG. 4
FIG. 5

FEEDFORWARD CONTROL APPARATUS FOR A SERVOMOTOR

BACKGROUND OF THE INVENTION

1. Technical Field

The present invention relates to a feedforward control apparatus capable of smoothly stably operating a servomotor.

2. Background Art

Generally known is a servo system for controlling a servomotor mounted as a drive source on various machines, such as machine tools, robots, etc., so that the deviation between a command motor position and an actual motor position is brought into zero. If there occurs a follow-up delay with respect to a position command in this servo system, the positional deviation increases. In machine tools, for example, this entails errors in work shape. Particularly, at the time of high-speed machining in which the position command quickly changes, such errors are liable to be caused.

In this respect, it is conventionally known to perform phase-lead compensation for the position command, i.e., position feedforward control, by adding a differential value of the position command to a speed command corresponding to the positional deviation, so as to eliminate a response delay of the servo system with respect to the position command, thereby preventing control errors, e.g., the work shape errors entailed in the high-speed machining.

The speed command, however, contains more high-frequency components when it is phase-lead-compensated than when it is not. On the other hand, a speed control loop of the conventional servo system for delivering a current command corresponding to the deviation between the speed command and an actual speed is not responsive enough to the high-frequency components of the speed command. According to the conventional servo system, therefore, the positional deviation changes in undulations. In other words, the action of the servomotor, and hence, of a mechanical system which uses the motor as its drive source, becomes unstable, and their vibration cannot be easily damped.

Also known is a servo system of another type in which a position command delivered from a numerical control apparatus is subjected to acceleration/deceleration processing so that the position command can change smoothly. Despite such acceleration/deceleration processing, however, the positional deviation is still subject to undulations, so that the motor may possibly be shocked.

DISCLOSURE OF THE INVENTION

The object of the present invention is to provide a feedforward control apparatus capable of smoothly stably operating a servomotor used as a drive source for various machines.

In order to achieve the above object, according to one aspect of the present invention, a feedforward control apparatus comprises: a position control loop for obtaining a first controlled variable on the basis of a position command and an actual servomotor position; first feedforward control means for differentiating the position command to obtain a first feedforward controlled variable; first addition means for adding the first feedforward controlled variable to the first controlled variable to obtain a speed command; a speed control loop for obtaining a second controlled variable on the basis of the speed command and an actual servomotor speed; second feedforward control means for differentiating the first feedforward controlled variable to obtain a second feedforward controlled variable; and second addition means for adding the second feedforward controlled variable to the second controlled variable to obtain a current command.

According to another aspect of the present invention, a feedforward control apparatus comprises: a position control loop for obtaining a controlled variable on the basis of a position command and an actual servomotor position; feedforward control means for differentiating the position command to obtain a feedforward controlled variable; acceleration/deceleration means for subjecting the feedforward controlled variable to acceleration/deceleration processing; and addition means for adding the feedforward controlled variable after the acceleration/deceleration processing to the controlled variable obtained by the position control loop to obtain a speed command.

As explained above, according to the control apparatus of the one aspect of the present invention, the speed command is obtained by adding the first feedforward controlled variable, obtained by differentiating the position command, to the first controlled variable obtained in the position control loop, so that a response delay of the position control loop with respect to the position command can be compensated to reduce control errors. In case that a servomotor adapted to be driven by means of the feedforward control apparatus of the present invention is used as a drive source for a machine tool, for example, work shape errors can be reduced, and machining can be effected at high speed and with high accuracy.

Since the current command is obtained by adding the second feedforward controlled variable, obtained by differentiating the first feedforward controlled variable, to the controlled variable obtained in the speed control loop, moreover, a response delay of the speed control loop with respect to the speed command can be compensated. As a result, the control errors, e.g., the work shape errors entailed in a machine tool, can be reduced, and the control operation can be improved in stability. Thus, the positional deviation is free from undulations, so that the servomotor and a mechanical system which uses the motor as its drive source can be prevented from undergoing vibration.

According to the feedforward control apparatus of the second aspect of the present invention, the feedforward controlled variable obtained by differentiating the position command is subjected to the acceleration/deceleration processing, and the speed command is obtained by adding the feedforward controlled variable after the acceleration/deceleration processing to the controlled variable obtained in the position control loop, so that a response delay of the position control loop can be compensated, and high-frequency noise components contained in the feedforward controlled variable can be removed. As a result, the control errors can be reduced, and the servomotor and the mechanical system can be prevented from being shocked due to undulations of the positional deviation.

BRIEF DESCRIPTION OF THE DRAWINGS

FIG. 2 is a block diagram showing the principal part of a control apparatus according to a second embodiment;

FIG. 3 is a diagram similar to FIG. 2, showing a third embodiment;

FIG. 4 is a diagram similar to FIG. 2, showing a fourth embodiment;

FIG. 5 is a diagram similar to FIG. 2, showing a fifth embodiment;

DETAILED DESCRIPTION OF THE PREFERRED EMBODIMENT

Best Mode of Carrying Out the Invention

Figure 6:
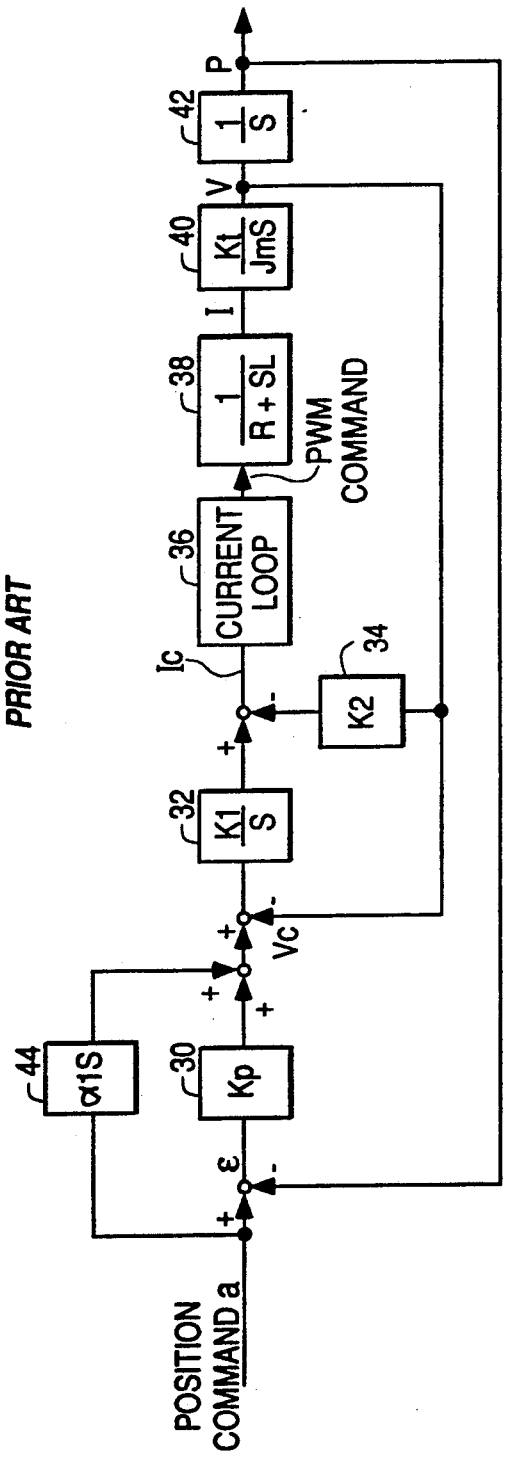
FIG. 6 is a block diagram showing a conventional servo system.

Referring to FIG. 6, in a conventional servo system having a position feedforward control function, an actual servomotor position, delivered from a seventh transfer element 42 which corresponds to a position sensor, is substracted from a position command a delivered from, e.g., a numerical control apparatus, to thereby obtain a positional deviation $\epsilon$. In a first transfer element 30 constituting part of a position control loop, the positional deviation $\epsilon$ is multiplied by a proportional gain Kp to obtain a first controlled variable. In a second transfer element (feedforward term) 44, the position command a is differentiated and the result of differentiation is multiplied by a coefficient $\alpha 1$ to obtain a feedforward controlled variable which is added to the first controlled variable, so as to produce a speed command Vc.

In a third transfer element 32, moreover, a speed deviation obtained by substracting an actual motor speed V from the speed command Vc is integrated, and the result of the integration is multiplied by a proportional gain K1. In a fourth transfer element 34 which, in conjunction with the element 32, constitutes a speed control loop, furthermore, the actual motor speed V is multiplied by a proportional gain K2. Also, a fourth transfer element output is subtracted from a third transfer element output (second controlled variable) to produce a current command Ic. The servo system further comprises a current control loop 36 for generating a pulse width modulation (PWM) command or torque command in accordance with the current command Ic.

A driving current I is applied to the servomotor from a control circuit, e.g., a transistor inverter (not shown), which responds to the current command Ic, whereby the servomotor is driven. In FIG. 6, numerals 38 and 40 denote fifth and sixth transfer elements which correspond to electrical and mechanical sections of the servomotor, respectively. Symbols R and L designate resistance and an inductance of a motor winding, respectively, and Kt and Jm designate the torque constant and inertia of the motor, respectively.

In case that the feedforward term 44 is removed from the conventional servo system shown in FIG. 6, if a forward or positive transfer function from the element 32 to the element 40 is "1", a transfer function P(S)/a(S) of the servo system and a positional deviation $\epsilon$ (S) in an S region are given by the following equations (1) and (2), respectively.

$$P(S)/a(S) = Kp/(S+Kp) \qquad (1)$$

$$\begin{aligned} \epsilon(S) &= a(S) - P(S) \\ &= S \cdot a(S)/(S + Kp) \end{aligned} \qquad (2)$$

Thus, when the motor is in a steady-state operation mode wherein it is operated at the constant actual speed V in response to the position command a (=At) with a constant rate of change (lamp input), the positional deviation $\epsilon$ (S) in the S region is given by equation (3), since the Laplace transform a(S) of the position command a is $A/S^2$.

$$\epsilon(S) = A/S(S+Kp) \qquad (3)$$

Based on the final-value theorem, a steady-state positional deviation $$\lim_{t \to \infty} e(t)$$

in a t region in the steady-state operation mode is given by equation (4).

$$\begin{aligned} \lim_{t \to \infty} e(t) &= \lim_{s \to 0} S \cdot e(S) \\ &= \lim_{s \to 0} A/(S + Kp) = A/Kp \end{aligned} \qquad (4)$$

The transfer function P(S)/a(S) of the conventional servo system shown in FIG. 6, including the feedforward term 44, and the positional deviation ε (S) in the S region and the positional deviation $$\lim_{t \to \infty} e(t)$$

in the t region, in the steady-state operation mode, are given by equations (5) to (7).

$$P(S)/a(S) = (a1 \cdot S + Kp)/(S + Kp) \quad (5)$$

$$\epsilon(S) = \{(1 - a1)/(S + Kp)\} \cdot (A/S) \quad (6)$$

$$\lim_{t \to \infty} e(t) = (1 - a1) \cdot A/Kp \quad (7)$$

As apparent from the comparison between equations (4) and (7), if position feedforward control is effected, the position loop gain increases to $(1-a1)$ times as high as the value obtained without such control, so that a follow-up delay of the servo system with respect to the position command is compensated.

Figure 9:
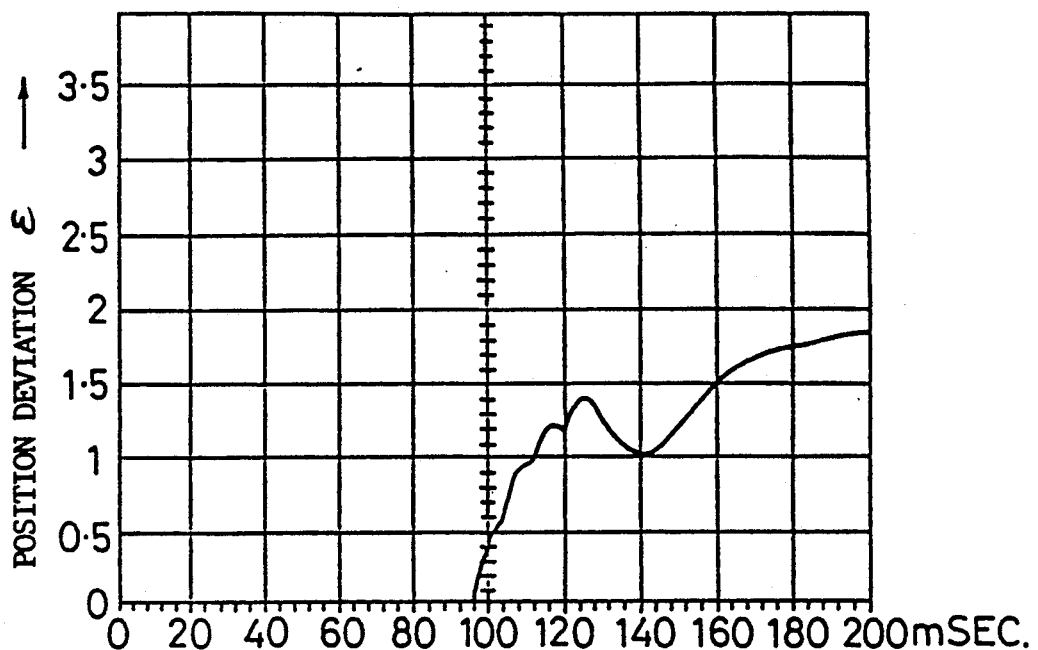
FIG. 9 is a graph illustrating an experimental result indicative of a change of a positional deviation with respect to elapse of time, observed when a position command with a constant rate of change is applied to the conventional apparatus of FIG. 6.
Figure 10:
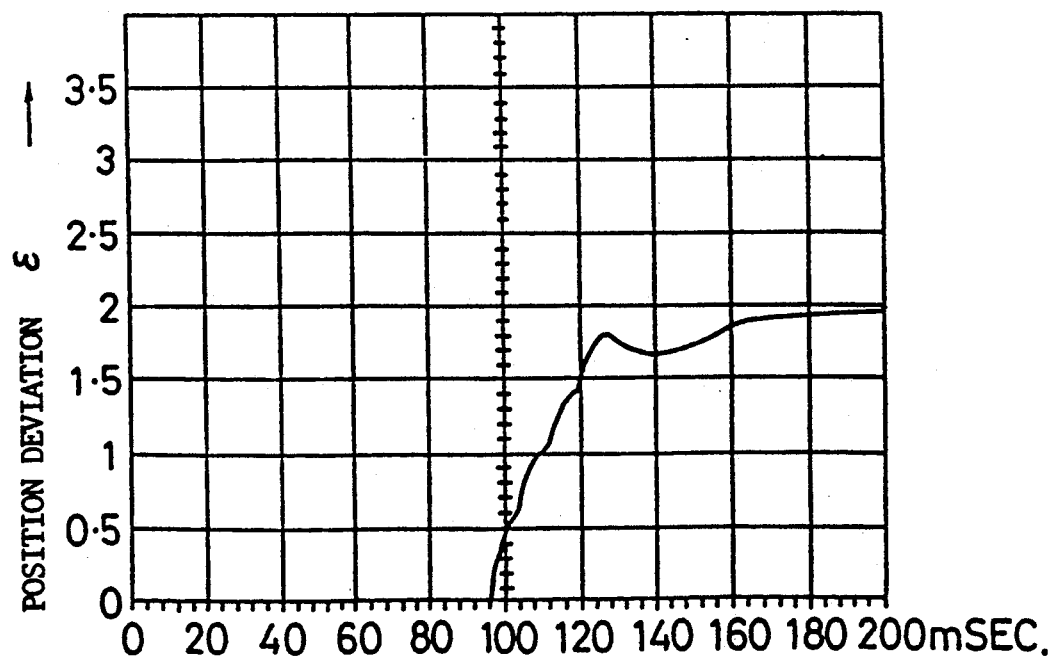
FIG. 10 is a graph similar to FIG. 9, showing the case of the apparatus according to the third embodiment.

The conventional servo system having the position feedforward control function, however, has not enough responsiveness to the high-frequency components of the speed control loop, and in particular, is subject to the aforementioned drawback that the positional deviation ε is undulatory when the feedforward coefficient a1 is set in the vicinity of "1." FIG. 9 shows a time-based transition of the positional deviation ε observed when the feedforward coefficient a1 is "0.8." In FIG. 9, the axis of ordinate represents a relative value of voltage data corresponding to the positional deviation ε, and command supply is started at the point of time corresponding to about 96 msec (so with FIG. 10).

Figure 11:
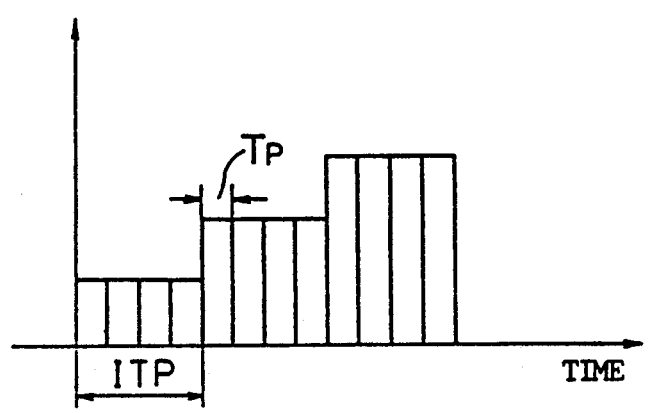
FIG. 11 is a diagram illustrating a change of the position command after conventional acceleration/deceleration processing.

Another conventional servo system with an acceleration/deceleration processing function, as shown in FIG. 11, executes acceleration/deceleration processing for position commands at intervals of the same period as a period (e.g., 8 msec) ITP for position command delivery between the numerical control apparatus and the servo system, thereby preventing a sudden change of the position commands. In the conventional servo system, however, position commands after acceleration/deceleration processing, which are identical with one another and are, in total, as many as position commands from the numerical control apparatus, are assigned individually to position control loop processing periods (e.g., 2 msec) Tp which belong to one ITP period. Therefore, the position commands after acceleration/deceleration processing sometimes may suddenly change when a shift is made from a certain ITP period to the next ITP period, after all. In this case, the feedforward controlled variable, obtained by differentiating the position command in the feedforward term 44, and hence, the speed command, contain high-frequency components. As a result, the positional deviation is inevitably undulatory.

Figure 1:
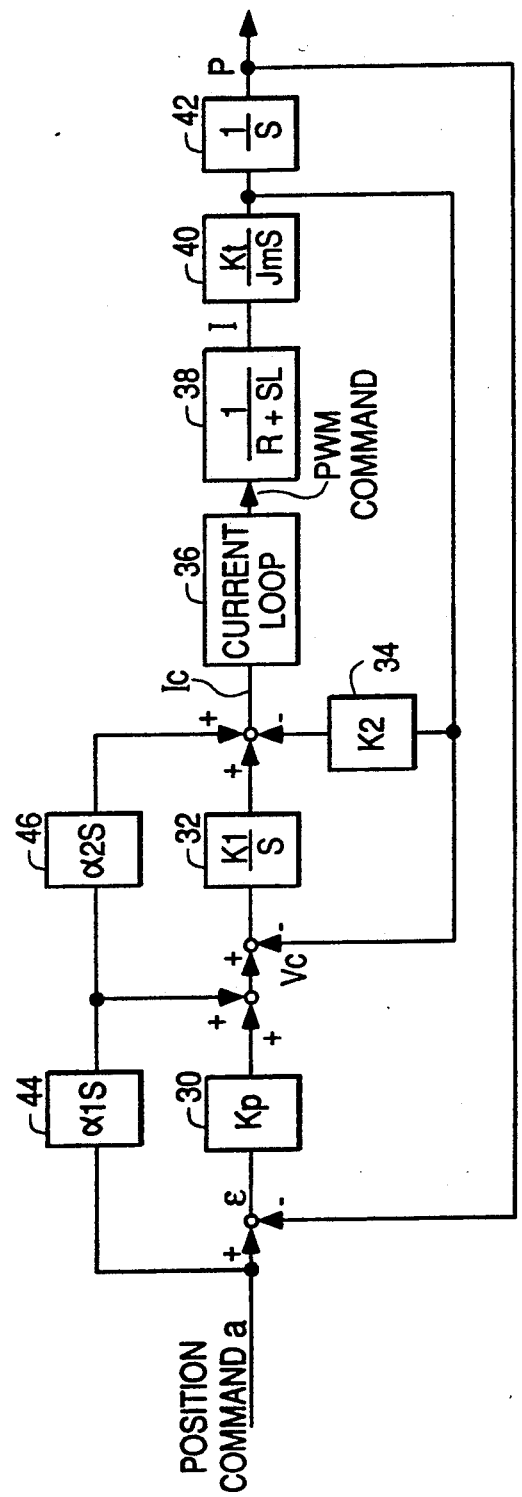
FIG. 1 is a block diagram showing a feedforward control apparatus according to a first embodiment of the present invention.

Referring to FIG. 1, a feedforward control apparatus according to a first embodiment of the present invention comprises a second feedforward term 46, besides the various elements of the conventional servo system shown in FIG. 6 (element 44 and its output will hereinafter be referred to as a first feedforward term and a first feedforward controlled variable, respectively). As in the case of the servo system of FIG. 6, the apparatus of the first embodiment is connected with a control circuit, e.g., a transistor inverter (not shown), a servomotor (not shown) corresponding to fifth and sixth transfer elements 38 and 40, and a position sensor corresponding to a seventh transfer element 42 (so with the embodiments mentioned later).

In the second feedforward term 46, the first feedforward controlled variable is differentiated, and the result of the differentiation is multiplied by a second feedforward coefficient $a2$ to obtain a second feedforward controlled variable. The coefficient $a1$ is experimentally decided at a value (ideally "1") which is conformable to the responsiveness of the servomotor, and the coefficient $a2$ is adjusted to a value in the vicinity of the value Jm/Kt obtained by dividing the motor inertia by the motor torque constant.

The following is a description of the operation of the feedforward control apparatus shown in FIG. 1.

In a position control loop, the positional deviation ε is obtained by subtracting the actual motor position from the position command a, and a first controlled variable is obtained by multiplying the positional deviation ε by the proportional gain Kp. The control output (first controlled variable) from the position control loop varies following the change of the position command a. If the change of the position command a is great, however, the first controlled variable may possibly delay behind the position command a.

The position command a is also applied to the first feedforward term 44, and is differentiated in the element 44. The first feedforward controlled variable is produced by multiplying the result of the differentiation by the coefficient $a1$. Then, the speed command Vc is obtained by adding the first feedforward controlled variable to the control output (first controlled variable) from the position control loop. Namely, the speed command Vc is feedforward-controlled by means of the first feedforward term 44. As a result, when the control output from the position control loop delays behind the position command a due to the substantial change of the position command a, the first feedforward controlled variable greatly changes, thereby causing the speed command Vc to follow up the position command a. Thus, the response delay in the position control loop is compensated.

In a speed control loop, the speed deviation obtained by subtracting the actual motor speed V from the speed command Vc is integrated, and a second controlled variable is obtained by multiplying the result of the integration by the proportional gain K1. The second controlled variable varies following the change of the speed command Vc. If the change of the speed command Vc is great, however, the control output (second controlled variable) from the speed control loop, including an integral term 32, may possibly delay behind the speed command Vc.

In the second feedforward term 46, the first feedforward controlled variable is differentiated, and the second feedforward controlled variable is obtained by multiplying the result of the differentiation by the coefficient $a2$. The second feedforward controlled variable is added to the control output from the speed control loop, and the current command Ic is obtained by subtracting the product of the actual motor speed V and the proportional gain K2 from the result of the addition.

Namely, the current command Ic is feedforward-controlled by means of the second feedforward term 46. As a result, when the control output (second controlled variable) from the speed control loop delays behind the speed command Vc due to the substantial change of the speed command Vc, the second feedforward controlled variable greatly changes, thereby causing the current command Ic to follow up the speed command Vc. Thus, the response delay in the speed control loop is compensated, so that the substantial responsiveness of the speed control loop is improved.

A driving current I is applied to the servomotor from the transistor inverter, which responds to a PWM command (torque command) produced in accordance with the current command Ic, whereby the servomotor rotates at the speed V. As the aforesaid two feedforward controls are effected, the capability of the servomotor to follow up the position command a is improved, and undulations of a time-based transition pattern of the positional deviation can be restrained even if the position command a suddenly changes.

Referring now to FIG. 2, a feedforward control apparatus according to a second embodiment of the present invention will be described.

The apparatus of the second embodiment comprises an acceleration/deceleration circuit 48 provided next to a feedforward term 44, besides the elements (some of which are shown in FIG. 2) corresponding to the various elements of the conventional servo system shown in FIG. 6. A feedforward controlled variable obtained in the element 44 is subjected to acceleration/deceleration processing in the circuit 48. Accordingly, even if the feedforward controlled variable, which corresponds to the product of a differential value of the position command a and the coefficient $\alpha 1$, greatly changes accompanying a substantial change of the position command a, high-frequency noise components contained in the feedforward controlled variable are removed by the acceleration/deceleration processing, so that the feedforward controlled variable after the acceleration/deceleration processing changes relatively smoothly. Thus, the speed command, which varies depending on the feedforward controlled variable, can be restrained from suddenly changing, so that the operation of a speed control loop can satisfactorily follow up the speed command, and the operation of the whole apparatus is improved in stability.

Referring now to FIGS. 12 to 15, transition patterns of the speed command during accelerating operation, decelerating operation, and steady-state operation, obtained when linear acceleration/deceleration processing is effected in the acceleration/deceleration circuit 48, will be described in comparison with those for the conventional apparatus of FIG. 6.

Figure 14:
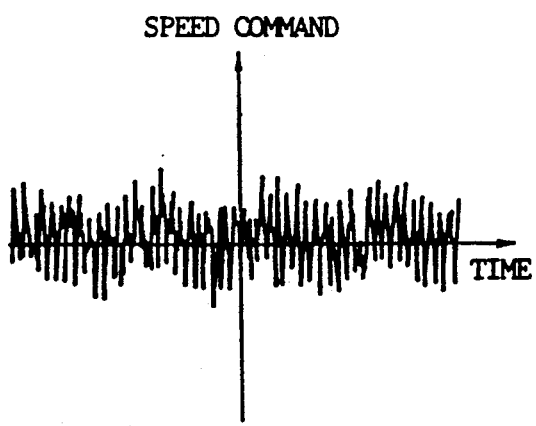
FIG. 14 is a graph illustrating an experimental result indicative of a change of the speed command in the apparatus of FIG. 6 during steady-state motor operation.
Figure 15:
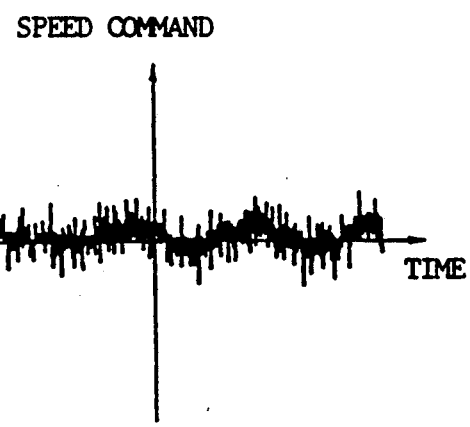
FIG. 15 is a graph similar to FIG. 14, showing the case of the apparatus according to the second embodiment.
Figures 13A, 13B:
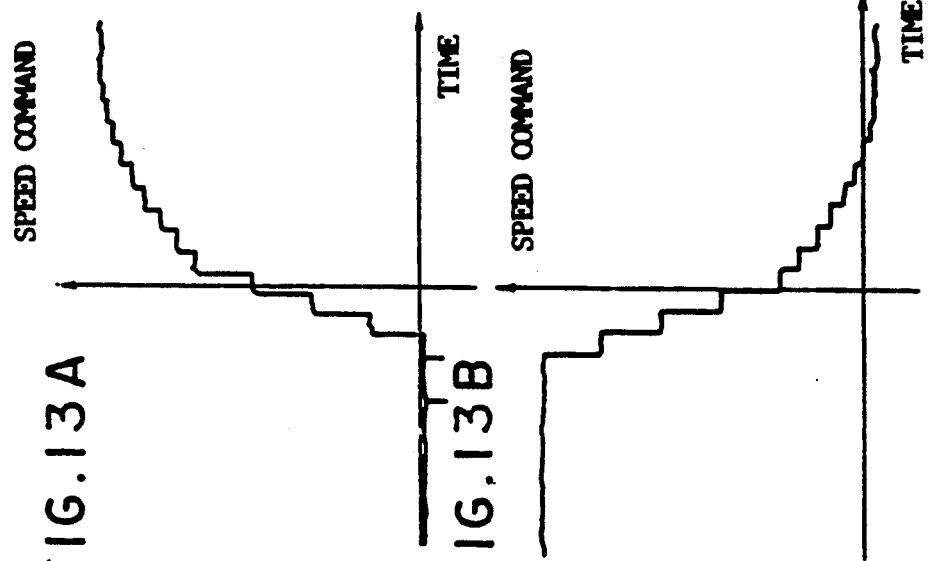
FIG. 13A is a graph similar to FIG. 12A, showing the case of the apparatus according to the second embodiment.
FIG. 13B is a graph similar to FIG. 12B, showing the case of the apparatus according to the second embodiment.
Figures 12A, 12B:
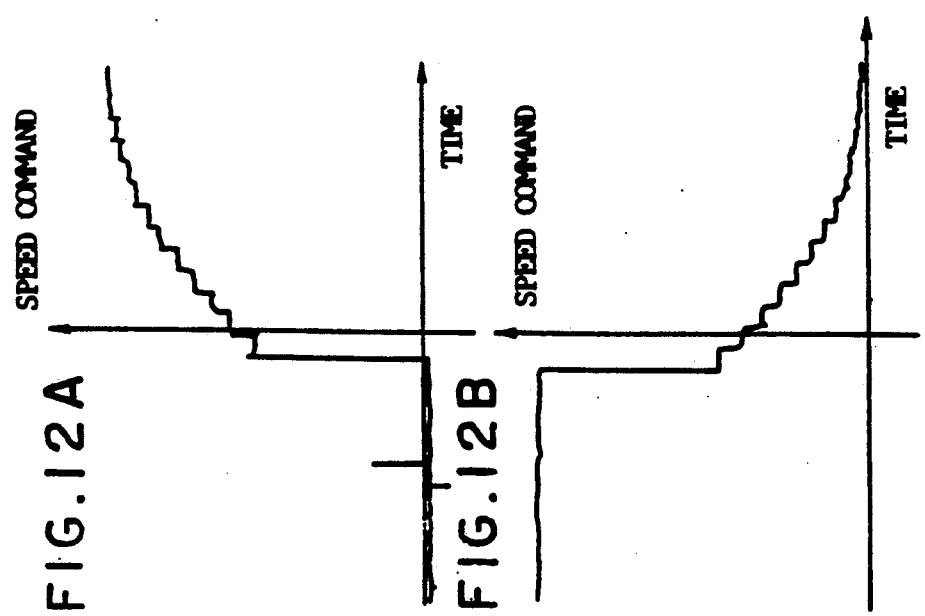
FIG. 12A is a graph illustrating an experimental result indicative of a change of a speed command in the conventional apparatus of FIG. 6, with respect to a stepped change of the position command in the incrementing direction.
FIG. 12B is a graph similar to FIG. 12A, showing a case in which the position command changes stepwise in the decrementing direction.

When the position command a is changed stepwise in the incrementing and decrementing directions, the speed command for the conventional apparatus of FIG. 6 suddenly changes, as shown in FIGS. 12A and 12B. On the other hand, the speed command for the apparatus of the present embodiment, produced on the basis of the feedforward controlled variable after acceleration/deceleration processing, smoothly changes, as shown in FIGS. 13A and 13B. Even in the steady-state motor operation, according to the apparatus of the present embodiment, the speed command changes more smoothly than the speed command transition pattern (FIG. 14) for the conventional apparatus, as shown in FIG. 15. It may be understood that the variations of the speed commands shown in FIGS. 14 and 15 are attributable mainly to variation in the position command supply from the numerical control apparatus. It may be understood, moreover, that the variation of the speed command for the apparatus of the present embodiment can be countervailed to a considerable degree by the feedforward controlled variable after acceleration/deceleration processing.

The operation of an apparatus similar to the apparatus of the second embodiment will be described later with reference to FIG. 8, so that a detailed description of the operation is omitted here (so with the embodiments described later).

Referring now to FIG. 3, a feedforward control apparatus according to a third embodiment of the present invention will be described.

The apparatus of the third embodiment combines the features of the apparatuses of the first and second embodiments, that is, it is provided with a second feedforward term 46 and an acceleration/deceleration circuit 48. Thus, a smoothly changing speed command is produced in accordance with a first feedforward controlled variable after acceleration/deceleration processing, which contains no high-frequency noise components. As a result, the operation in a speed control loop is improved in stability. A controlled variable from the speed control loop is corrected by means of a second feedforward controlled variable obtained in the element 46, so that the responsiveness of the speed control loop is improved. When the position command a with a constant rate of change is supplied, the positional deviation $\epsilon$ for the apparatus of FIG. 3 changes as shown in FIG. 10, that is, undulations of the positional deviation is less than in the case of a position transition pattern (FIG. 9) for the conventional apparatus obtained under the same condition.

Referring to FIG. 4, a feedforward control apparatus according to a fourth embodiment of the present invention comprises a second acceleration/deceleration circuit 50 besides the elements constituting the apparatus of FIG. 3. The circuit 50 is provided next to a second feedforward term 46, whereby a second feedforward controlled variable obtained in the element 46 is subjected to acceleration/deceleration processing, so that the controlled variable is restrained from suddenly changing. As a result, a command current Ic produced on the basis of a controlled variable obtained in a speed control loop and the second feedforward controlled variable after the acceleration/deceleration processing can be restrained from suddenly changing.

Referring to FIG. 5, a feedforward control apparatus according to a fifth embodiment of the present invention comprises a third acceleration/deceleration circuit 52 besides the elements constituting the apparatus of FIG. 4. The circuit 52 is provided next to a second acceleration/deceleration circuit 50, whereby a second feedforward controlled variable after acceleration/deceleration processing, obtained in the circuit 50, is differentiated, and a third feedforward controlled variable is obtained by multiplying the result of the differentiation by a coefficient $\alpha 3$. A control output from a current control loop 36 is corrected by means of the third feedforward controlled variable to produce a PWM command (torque command). As a result, a response delay of the current control loop 36 with respect to a current command is compensated.

An acceleration/deceleration circuit (not shown) may be provided next to the element 52 of FIG. 5. In this case, high-frequency components contained in the third feedforward controlled variable are removed, so that a sudden change of the PWM command can be restrained.

Figure 7:
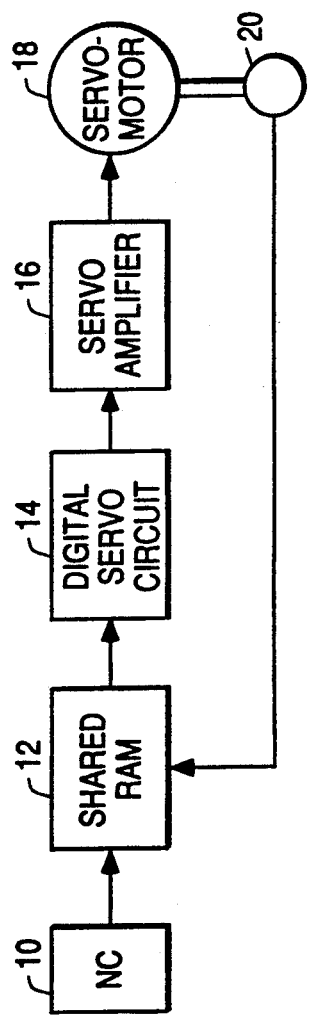
FIG. 7 is a block diagram showing a digital servo circuit for effecting the first to fifth embodiments of the present invention and its peripheral elements.

Referring now to FIG. 7, a servo system for embodying the aforementioned first to fifth embodiments will be described.

The servo system is provided with a digital servo circuit 14 which has the functions of the feedforward control apparatuses shown in FIGS. 1 to 5. The circuit 14 includes a microcomputer (not shown). A central processing unit (hereinafter referred to as CPU) of the computer is connected, on the one hand, to a numerical control apparatus 10 through a shared memory 12 formed of a random access memory (RAM), and on the other hand, to a servomotor 18 through an output circuit of the computer and a servo amplifier 16. Also, the CPU is connected through an input circuit of the computer to a pulse coder 20 which generates a series of pulses as the motor rotates. The pulse train from the pulse coder 20, which is generated at a frequency corresponding to the actual motor speed, represents the actual motor position.

The CPU is arranged to read from the shared RAM 12 a position command which is written therein from the numerical control (NC) apparatus 10 at intervals of a predetermined period ITP, and calculate position commands $a_n$ (n = 1, 2, ..., N) for N number of position control loop processing periods Tp which belong to one position command write period ITP. The calculated position commands $a_n$ which are identical with one another and are, in total, as many as position commands written in the shared RAM 12. Also, the CPU is operable to execute software processing in accordance with a control program (not shown), thereby achieving various functions (functions to calculate controlled variables for position and speed control loops and first to third feedforward controlled variables, functions to produce a speed command, current command, and PWM command, and acceleration/deceleration processing function) of the feedforward control apparatuses of FIGS. 1 to 5. The servo amplifier 16 is responsive to the PWM command to drive the servomotor 18.

Figure 8:
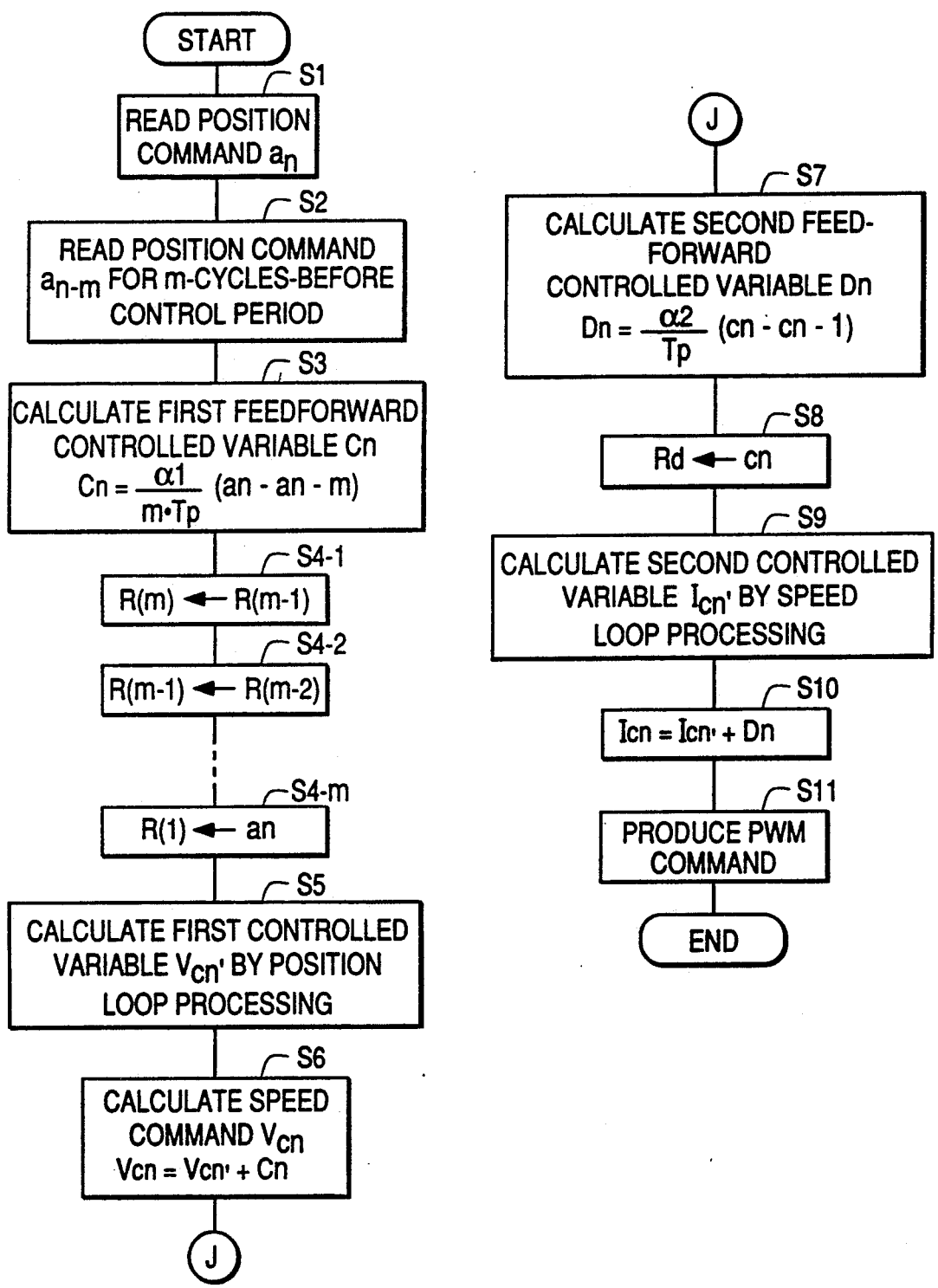
FIG. 8 is a flow chart for illustrating a feedforward control process executed by a processor of FIG. 7 for embodying the third embodiment.

Referring now to FIG. 8, the operation of the servo system of FIG. 7 will be described, for the case wherein the digital servo circuit 14 of FIG. 7 embodies the third embodiment.

The CPU of the digital servo circuit 14 executes feedforward control processing of FIG. 8 at intervals of the period Tp. More specifically, in each processing period, the CPU reads a position command $a_n$ (n = 1, 2, ..., N; $a_n = 0$ where n ≤ 0), previously calculated and stored in a built-in register (not shown), and converts it by a unit system by multiplying the position command $a_n$ by a conversion factor (Step S1 of FIG. 8). Then, a position command $a_{n-m}$ for the m-cycles-before control period is read out from a built-in register R(m) (Step S2). In order to achieve the functions of the elements 44 and 48 of FIG. 3, moreover, a first feedforward controlled variable $c_n$, corresponding to a value obtained by subjecting a differential value $b_n$ of a position command, given by the following equation (8), to linear acceleration/deceleration processing, is calculated on the basis of the position commands $a_n$ and $a_{n-m}$ and in accordance with equation (10) (Step S3). Equation (10) can be derived by substituting equation (8) into equation (9). The positive integer m is a factor which decides a time constant m·Tp for the acceleration/deceleration processing, and is previously set together with the first feedforward coefficient $\alpha 1$.

$$b_n = (1/Tp) \cdot (a_n - a_{n-1}) \tag{8}$$

$$c_n = (\alpha 1/m) \cdot \sum_{i=n-m+1}^{n} b_i \tag{9}$$

$$c_n = (\alpha 1/m \cdot Tp) \cdot \left\{ \sum_{i=n-m+1}^{n} (a_i - a_{i-1}) \right\} \tag{10}$$

$$= (\alpha 1/m \cdot Tp) \cdot (a_n - a_{n-m})$$

The CPU transfers the contents stored in registers R(m-1) to R(1) to registers R(m) to R(2), respectively, and causes the register R(1) to store with the position command $a_n$ read out in Step S1 (Steps S4-1 to S4-m). Thereupon, the process for calculating the first feedforward controlled variable ends.

Then, the CPU obtains the positional deviation ε by subtracting an actual motor position Pn from the position command $a_n$, and further obtains a control output (first controlled variable) $Vc_n$, of the position control loop by multiplying the positional deviation ε by the position control loop gain Kp (Step S5). Also, a speed command $Vc_n$ is obtained by adding the first feedforward controlled variable $c_n$ calculated in Step S3 to the first controlled variable $Vc_n$, (Step S6). Moreover, a first feedforward controlled variable $c_{n-1}$ calculated during the preceding control period is read out from a register Rd, and the value $c_{n-1}$ is subtracted from the first feedforward controlled variable $c_n$ for the current control period. The result of the subtraction is multiplied by the second feedforward coefficient $\alpha 2$, and a second feedforward controlled variable Dn is obtained by dividing the result of the multiplication by the control period Tp (Step S7). Then, the controlled variable $c_{n-1}$ for the present control period is stored in the register Rd (Step S8).

In order to achieve the integral-plus-proportional control function of the speed control loop of FIG. 1, moreover, the CPU obtains a speed deviation by subtracting the actual motor speed V from the speed command $Vc_n$ obtained in Step S6, and adds it to the stored content of an accumulator of the computer. Then, a value corresponding to the output of the integral term 32 of FIG. 1 is obtained by multiplying the result of the addition by the integral gain K1, and a value corresponding to the output of the transfer element 34 of FIG. 1 is obtained by multiplying the actual motor speed V by the proportional gain K2. Then, a second controlled variable (control output of the speed control loop) $Ic_n$, is obtained by subtracting the calculated value corresponding to the transfer element output from the calculated value corresponding to the integral term output (Step S9). Furthermore, a current command $Ic_n$ is obtained by adding the second feedforward controlled variable Dn calculated in Step S7 to the second controlled variable $Ic_n$, (Step S10), and current control loop processing is executed in accordance with this current command $Ic_n$ to generate a PWM command (Step S11). The operational amplifier 16, which responds to this PWM command, supplies a driving current to the servomotor 18, thereby driving the motor.

As described above, the digital servo circuit 14 executes various controls by software processing, and the aforementioned various other embodiments than the third embodiment can be carried out by changing the contents of the control program.

In the case of embodying the first embodiment (FIG. 1), which is equivalent to an arrangement obtained by removing the acceleration/deceleration circuit 48 from the apparatus of FIG. 3, the differential value $b_n$ of the position command given by equation (8) is used in place of the first feedforward controlled variable $c_n$. To this end, the CPU of the digital servo circuit 14 performs the calculation based on equation (8) instead of executing Steps S3 to S 4-m for the calculation and storage of the first feedforward controlled variable shown in FIG. 8.

In effecting the second embodiment (FIG. 2), which is equivalent to an arrangement obtained by removing the second feedforward term 46 from the apparatus of FIG. 3, Steps S7, S8 and S10 for the calculation, storage, and addition of the second feedforward controlled variable are unnecessary, and the second controlled variable $Ic_n$, calculated in Step S9 is used as the current command $Ic_n$.

In effecting the fourth embodiment (FIG. 4), which is equivalent to an arrangement obtained by adding the second acceleration/deceleration circuit 50 to the apparatus of FIG. 3, processes similar to Steps S3 to S4-m for the calculation and storage of the first feedforward controlled variable are executed in place of Steps S7 and S8 for the calculation and storage of the second feedforward controlled variable, and the second feedforward controlled variable Dn after acceleration/deceleration processing given by the following equation (11) is calculated.

$$Dn = (\alpha 2/d \cdot Tp) \cdot (c_n - c_{n-d}) \qquad (11)$$

where symbol d designates a factor which decides an acceleration/deceleration time constant $d \cdot Tp$ for the acceleration/deceleration processing.

In effecting the fifth embodiment, which is equivalent to an arrangement obtained by adding the second acceleration/deceleration circuit 50 and the third feedforward term 52 to the apparatus of FIG. 3, the second feedforward controlled variable Dn after acceleration/deceleration processing is calculated according to equation (11) instead of executing Steps S7 and S8, and at the same time, a differential value of the controlled variable Dn after acceleration/deceleration processing is calculated and stored in processes similar to Steps S7 and S8, and this value is added to the control output from the current control loop.

I claim:

1. A feedforward servomotor control apparatus for controlling the speed of a servomotor based on a position command and an actual servomotor position signal, comprising:
   a position control loop for obtaining a first controlled variable on the basis of the position command and the actual servomotor position signal;
   first feedforward control means for differentiating said position command to obtain a first feedforward controlled variable;
   first addition means for adding said first feedforward controlled variable to said first controlled variable to obtain a speed command;
   a speed control loop for obtaining a second controlled variable on the basis of said speed command and an actual servomotor speed;
   second feedforward control means for differentiating said first feedforward controlled variable; and
   second addition means for adding said second feedforward controlled variable to said second controlled variable to obtain a current command signal to control the speed of the servomotor.

2. A feedforward servomotor control apparatus for controlling the speed of a servomotor based on a position command and an actual servomotor position signal, comprising:
   a position control loop for obtaining a controlled variable on the basis of the position command and the actual servomotor position signal;
   feedforward control means for differentiating said position command to obtain a feedforward controlled variable;
   acceleration/deceleration means for subjecting said feedforward controlled variable to acceleration/deceleration processing;
   addition means for adding the feedforward controlled variable after the acceleration/deceleration processing to said controlled variable obtained by said position control loop to obtain a speed command signal; and
   an amplifier connected to control the servomotor in response to said current command signal.

3. A feedforward control apparatus for a servomotor according to claim 2, further comprising:
   a speed control loop for obtaining a second controlled variable on the basis of said speed command and an actual servomotor speed;
   second feedforward control means for differentiating the feedforward controlled variable after said acceleration/deceleration processing to obtain a second feedforward controlled variable; and
   second addition means for adding said second feedforward controlled variable to said second controlled variable to obtain a current command.

4. A feedforward control apparatus for a servomotor according to claim 2, further comprising:
   a speed control loop for obtaining a second controlled variable on the basis of said speed command and an actual servomotor speed;
   second feedforward control means for differentiating the feedforward controlled variable after said acceleration/deceleration processing to obtain a second feedforward controlled variable;
   second acceleration/deceleration means for subjecting said second feedforward controlled variable to acceleration/deceleration processing; and
   second addition means for adding said second feedforward controlled variable after the acceleration/deceleration processing to said second controlled variable to obtain a current command.

5. A feedforward control apparatus for a servomotor according to claim 4, further comprising:
   a current control loop for obtaining a third controlled variable on the basis of said current command;
   third feedforward control means for differentiating the second feedforward controlled variable after said acceleration/deceleration processing to obtain a third feedforward controlled variable;
   third acceleration/deceleration means for subjecting said third feedforward controlled variable to acceleration/deceleration processing; and
   third addition means for adding the third feedforward controlled variable after the acceleration/deceleration processing to said third controlled variable to obtain a torque command.

* * * * *

UNITED STATES PATENT AND TRADEMARK OFFICE
CERTIFICATE OF CORRECTION

PATENT NO. : 5,107,193
DATED : April 21, 1992
INVENTOR(S) : Yasusuke IWASHITA

It is certified that error appears in the above-identified patent and that said Letters Patent is hereby corrected as shown below:

Title Page, under "Abstract", item (57), line 6, after "deviation" insert --,--.

Column 3, line 52, change "EMBODIMENT" to

--EMBODIMENTS"--;

Column 3, line 54, delete "Best Mode of Carrying

Out The Invention".

Column 4, line 4, change "Substracting" to

--Subtracting--.

Signed and Sealed this

Seventeenth Day of August, 1993

Attest:

BRUCE LEHMAN

Attesting Officer

Commissioner of Patents and Trademarks